(12) United States Patent
Adam

(10) Patent No.: US 8,402,002 B2
(45) Date of Patent: Mar. 19, 2013

(54) SYSTEM AND METHOD FOR EVENT LOG REVIEW

(75) Inventor: Christian C. Adam, Somerset, NJ (US)

(73) Assignee: Barclays Capital Inc., New York, NY (US)

( * ) Notice: Subject to any disclaimer, the term of this patent is extended or adjusted under 35 U.S.C. 154(b) by 192 days.

(21) Appl. No.: 11/525,212

(22) Filed: Sep. 22, 2006

(65) Prior Publication Data
US 2007/0179986 A1 Aug. 2, 2007

Related U.S. Application Data

(60) Provisional application No. 60/720,169, filed on Sep. 23, 2005.

(51) Int. Cl.
*G06F 7/00* (2006.01)
*G06F 17/00* (2006.01)
*G06F 17/30* (2006.01)

(52) U.S. Cl. .................... 707/688; 707/737

(58) Field of Classification Search ......... 707/200, 707/100, 101, 104.1, 648, 672, 673, 682, 707/603, 608, 688, 737; 709/217
See application file for complete search history.

(56) References Cited

U.S. PATENT DOCUMENTS

| | | | |
|---|---|---|---|
| 6,173,418 B1* | 1/2001 | Fujino et al. | 714/20 |
| 6,768,994 B1* | 7/2004 | Howard et al. | 1/1 |
| 6,963,910 B1* | 11/2005 | Belknap et al. | 709/223 |
| 7,302,436 B2* | 11/2007 | Qubti et al. | 707/100 |
| 7,373,666 B2* | 5/2008 | Kaler et al. | 726/23 |
| 7,590,971 B2* | 9/2009 | Ferguson et al. | 717/109 |
| 7,599,911 B2* | 10/2009 | Manber et al. | 707/3 |
| 7,831,498 B2* | 11/2010 | Morales et al. | 705/37 |
| 2002/0143938 A1* | 10/2002 | Alexander et al. | 709/224 |
| 2003/0135517 A1* | 7/2003 | Kauffman | 707/103 R |
| 2003/0167191 A1* | 9/2003 | Slabonik et al. | 705/4 |
| 2004/0167859 A1* | 8/2004 | Mirabella | 705/59 |
| 2004/0193462 A1* | 9/2004 | Beasley | 705/7 |
| 2005/0097571 A1* | 5/2005 | Uguccioni | 719/318 |
| 2005/0286435 A1 | 12/2005 | Ogawa et al. | |
| 2006/0117091 A1* | 6/2006 | Justin | 709/217 |

FOREIGN PATENT DOCUMENTS

| | | |
|---|---|---|
| EP | 0913966 | 9/2005 |
| JP | 200611888 | 1/2006 |

OTHER PUBLICATIONS

Written Opinion of PCT/US2006/037081 dated Jul. 5, 2007, 6 pages.
International Search Report of PCT/US2006/037081 dated Jul. 5, 2007, 3 pages.
International Preliminary Report on Patentability of PCT/US2006/037081 dated Apr. 3, 2008, 8 pages.
Publication of PCT/US2006/037081 dated Apr. 5, 2007, 27 pages.
JP First Office Action dated Jul. 27, 2010 for Japanese Application No. 2008-532437, 6 pages.
EP Search Report dated May 17, 2010 for European Application No. 06825083.6, 5 pages.

(Continued)

*Primary Examiner* — Usmaan Saeed
*Assistant Examiner* — Md. I Uddin
(74) *Attorney, Agent, or Firm* — Morgan, Lewis & Bockius LLP

(57) ABSTRACT

An event log management system includes an event log source to generate event log data associated with an asset of an electronic network, an event log database to store the event log data, an asset database to store asset information, and a log report generator to package the event log data into a log report based on the asset information stored in the asset database.

15 Claims, 9 Drawing Sheets

OTHER PUBLICATIONS

CA Office Action dated Mar. 23, 2011 for Canadian Application No. 2,623,491, 3 pages.

JP Decision of Rejection dated Nov. 24, 2010 for Japanese Application No. 2008-532437, 3 pages.

* cited by examiner

SYSTEM AND METHOD FOR EVENT LOG REVIEW

This application claims the benefit of the U.S. Provisional Patent Application No. 60/720,169 filed on Sep. 23, 2005, which is hereby incorporated by reference. Further, this application is related to U.S. patent application Ser. Nos. 11/025,694 and 11/025,871 both filed on Dec. 29, 2004, which are also hereby incorporated by reference.

BACKGROUND OF THE INVENTION

1. Field of the Invention

The present invention relates to a system and method for management of event logs, and more particularly to a system and method for generating and tracking review of event log reports.

2. Discussion of the Related Art

Advancements in information technologies (IT) have provided ways to interconnect computers and other communication devices in an efficient manner to allow easier exchange of data and access to services. For firms that provide intensive data services, millions of computers and other communication devices attempt to connect and access the data services provided by the firm. These requested data connections may be from internal as well as external clients.

For security purposes, security systems are set in place to log these transactions that are later reviewed to check for security threats. Security issues generally arise in the context of attempts at unauthorized access to servers, files, applications, and other IT assets of the firm. In addition, other events, such as modified files and applications that appear to be performed by legitimate sources, may also be a concern that can only be identified by those who are familiar with the asset. Moreover, regulatory policies, such as Sarbanes-Oxley regulatory requirements, for example, may be in place that requires preventive and detective controls to be provided within the firm to ensure integrity of the data. However, there are several challenges to providing such security oversight in a firm.

In a typical week, thousands, if not millions, of log events may be recorded depending on the size and IT capabilities of a firm. Accordingly, it is a huge challenge to review each and every log event. Further, depending on the IT capabilities of the firm, these log events may be generated by multiple applications spread across multiple servers. Typically, these security logs are reviewed by the security personnel assigned to monitor the network and its operations. While the security personnel may be able to recognize logs directed to attempts at unauthorized access or bottlenecking events to the network, log events specific to certain type of assets, such as a specialized application or server, may easily be overlooked. Moreover, the volume of the log events generated over a period of time as well as the non-descript nature of the logs create a huge challenge to properly review and assess the log events to determine impropriety of the events. Additionally, current security monitoring systems do not have an efficient way to document who reviewed the log events, and which log events were reviewed.

SUMMARY OF THE INVENTION

Accordingly, the present invention is directed to a system and method that substantially obviates one or more problems due to limitations and disadvantages of the related art.

An object of the present invention is to provide a system and method for security log review that facilitates efficient monitoring of log events.

Another object of the present invention is to provide a system and method for security log review that provides effective preventive and detective controls of the data and the data source assets.

Yet another object of the present invention is to provide a system and method for security log review that securely routes log events to personnel best suited to determine propriety of the events.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the event log management system of the present invention includes an event log source to generate event log data associated with an asset of an electronic network, an event log database to store the event log data, an asset database to store asset information, and a log report generator to package the event log data into a log report based on the asset information stored in the asset database.

In another aspect, the method of managing an event log includes the steps of generating event log data associated with an asset of an electronic network, storing the event log data in an event log database, storing asset information in an asset database, and packaging the event log data into a log report based on the asset information stored in the asset database.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE PREFERRED EMBODIMENTS

Reference will now be made in detail to the preferred embodiments of the present invention, examples of which are illustrated in the accompanying drawings.

The system and method for security log review according to the present invention facilitates efficient collect of log events, generation of log reports, review of the log reports, and retention of the log reports and review activity for audit, regulatory compliance, and security of an organization on an enterprise scale. "Assets" as used herein includes, but are not limited to, hardware and software assets related to information technology (IT) of the organization. Some examples of hardware assets include servers, client computers, printers, routers, network hubs, and storage devices. Examples of software assets include computer program applications, databases, and data files.

Figure 1:
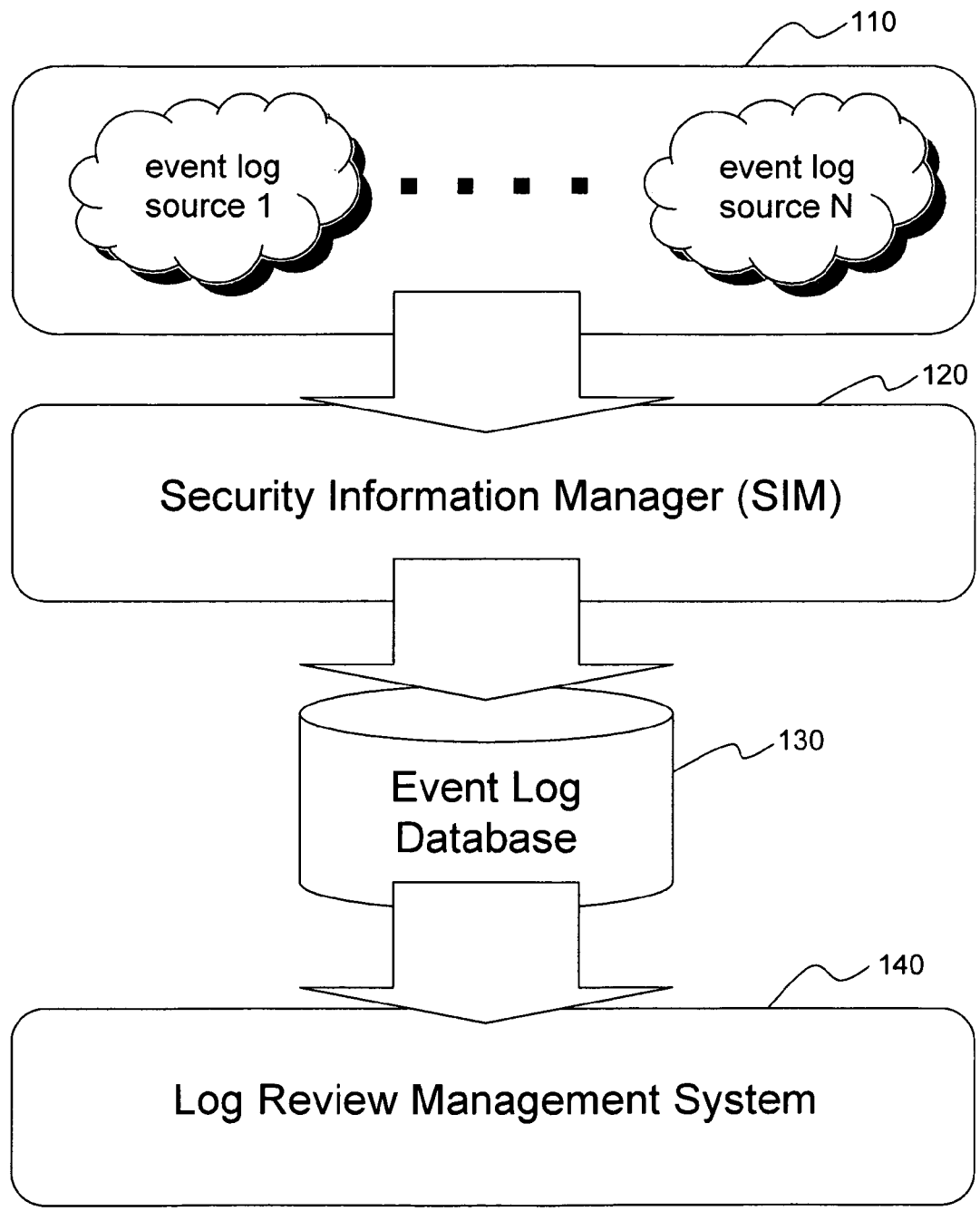
FIG. 1 is illustrates an exemplary embodiment of the present invention.

FIG. 1 illustrates an exemplary embodiment of the present invention. In particular, the present invention generally includes a plurality of event log sources 110, a security information manager (SIM) 120, an event log database 130, and a log review management system 140. The plurality of event log sources 10 produce event log data related to various assets of the organization. For example, an event log source may be simple network management protocol (SNMP) sources, firewall sources, and other sources of events related to the assets of the organization. The event log data may be, but not limited to, data related to firewall instances, such as communications that are flowing into and/or out of the organization's network, access activities of various servers and peripheral devices within the organization's network, and modifications to program directory structure, such as modifications to files and applications stored on the servers of the organization's network.

The raw event log data are communicated to the SIM 120, which processes the raw event log data and stores the event logs in an event log database 130. Because the raw event logs are generated by disparate sources, the SIM 120 may receive the raw event log data and normalize the event log data into a common format to be stored in the event log database 130. For example, the raw event log data may be normalized to include common information, such as a time stamp of the event, an asset ID, a user ID who initiated the event, identification of the event, and any information associated with the event. The event log data are received, processed, and stored in real-time as the events occur throughout the network. The event logs stored in the event log database 130 cannot be accessed by authorized users in order to maintain the integrity of the data.

The log review management system 140, to be described in more detail below, takes the event logs and packages the event logs into event log reports that correspond to a particular asset. The event log reports are then disseminated to the designated custodians of the assets to be reviewed. The log review management system 140 tracks and stores the review activities along with the event log reports.

Figure 2:
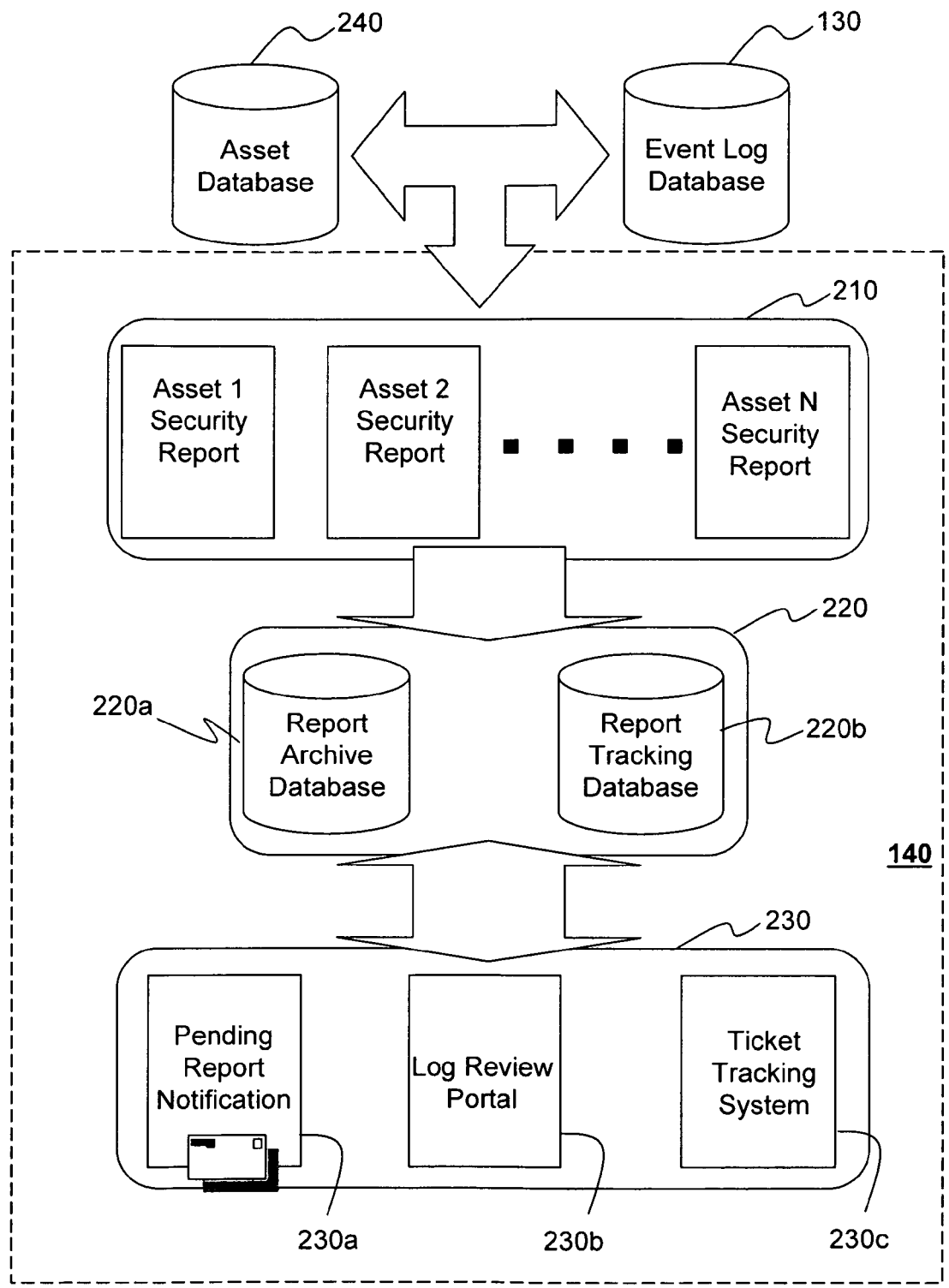
FIG. 2 is illustrates an exemplary embodiment of the log review management system according to the present invention.

FIG. 2 illustrates an exemplary embodiment of the log review management system 140. The log review management system 140 includes a report generator 210, a report data store 220, and a review monitor 230. In the exemplary embodiment, the log review management system 140 is implemented as a middleware that interfaces with the SIM 120 (FIG.1) of the enterprise network to facilitate ease of integration with existing IT infrastructure of the organization. However, other implementations may be used without departing from the scope of the present invention.

The report generator 210 generates event log reports (e.g., report 1 through report N) from the event logs stored in the event log database 130 (FIG. 1). In particular, the report generator 210 obtains asset information from asset database (ADb) 240 and packages the event log data stored in the event log database 130. The asset database 240 is a database that stores information about every asset of the organization. For example, the asset database 240 is a relational database that stores information of the asset, such as asset name, asset type, descriptions of the asset, and the name of the asset manager (e.g., owner, designated custodian and/or reviewer). The details of the asset database 240 is explained in more detail in a co-pending U.S. patent application Ser. No. 11/025,871, filed on Dec. 29, 2004, the contents of which are incorporated herein by reference. The report generator 210 correlates the event log data from the event log database 130 with the asset information from the asset database 240. For example, as shown in FIG. 2, all event log data associated with an "asset name" may be grouped and packaged together in a report, such as a spreadsheet, for example. In another example, all event log data associated with an "asset type" may be grouped and packaged together in another report. The reports may be packaged based on any asset property without departing from the scope of the present invention.

Once a report has been generated by the report generator 210, the generated report is sent to the report data store 220. As shown in FIG. 2, the report data store 220 includes a report archive database 220a and a report tracking database 220b. The generated reports are stored together with the metadata relevant to the generated time and the related asset that the report encompasses in the report archive database 220a. For example, the report metadata may include the report issue time, the report reviewer name, the report file name, and count of the number of events to be reviewed in the report. However, other information regarding the reports may be stored without departing from the scope of the present invention. The report tracking database 220b stores tracking information of each of the reports generated and stored in the report archive database 220a. For example, the report tracking database 220b stores information such as the report file name, the time when availability of the report is communicated to the asset manager, period of time covered by the event log data in the report, and the time when completion of the review of the report is acknowledged. The information stored in the report tracking database 220b is explained further below with respect to the report monitor 230.

Once a report has been generated and stored in the report archive database 220a, the report monitor 230 communicates a notification message to the asset manager designated to the asset for which the report is generated. This information is obtained from the asset database 240 by the report generator 210. Accordingly, only those who are designated in the asset database 240 as the authorized asset manager of a particular asset are notified of the generated log report related to the particular asset. More importantly, the notification of the pending report, which may be an electronic mail (email) 230a, for example, does not include the actual report. Rather, the pending report notification directs the asset manager (herein referred to as the "reviewer") is directed to a secure portal 230b from which to view the pending report. The portal may be an internet or intranet portal. For instance, the email notification 230a may include an embedded hypertext link that, when activated by the reviewer, will give the reviewer access to an HTTP review portal 230b. However, other types of electronic interfaces and implementations may be used without departing from the scope of the present invention.

Figure 3:
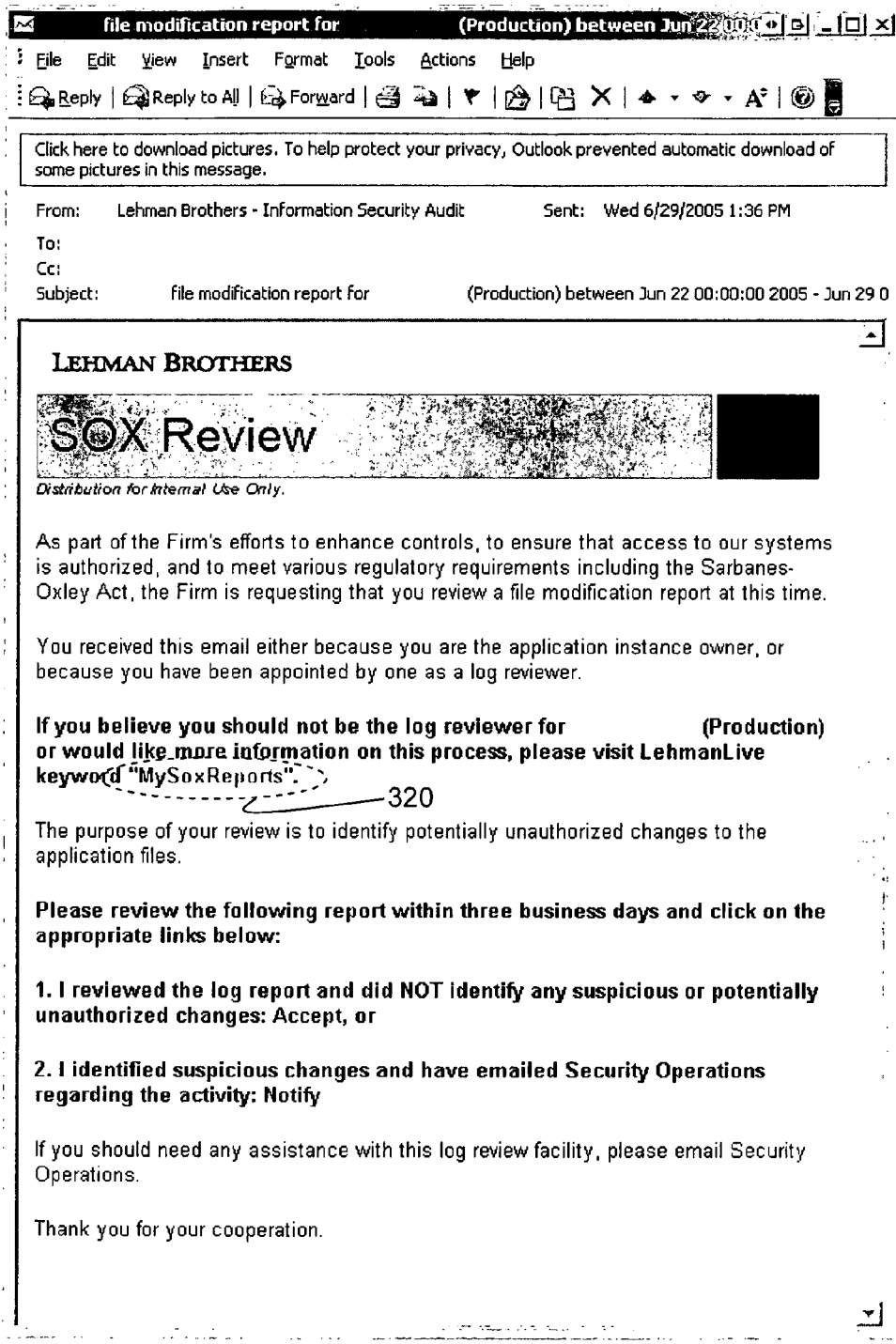
FIG. 3 illustrates a view of an exemplary electronic notification message according to the present invention.

FIG. 3-7 illustrate exemplary views of the communications according to the present invention. For example, FIG. 3 shows an exemplary notification of a pending report to be reviewed. As shown in FIG. 3, an exemplary email notification 310 is sent to a reviewer designated as the asset manager in the asset database 240 (FIG. 2). The email notification 310 includes a hypertext link 320 to the secure portal 230*b*. As shown in this example, the reviewer is also given the ability to notify the system if the report is related to an asset that is not designated to the reviewer. Once the reviewer activates the link 320, the reviewer is given assess to a log in page of the portal 230*b* (not shown). After an authorization and authentication process, the reviewer is given assess to the pending reports to be reviewed.

Figure 4:
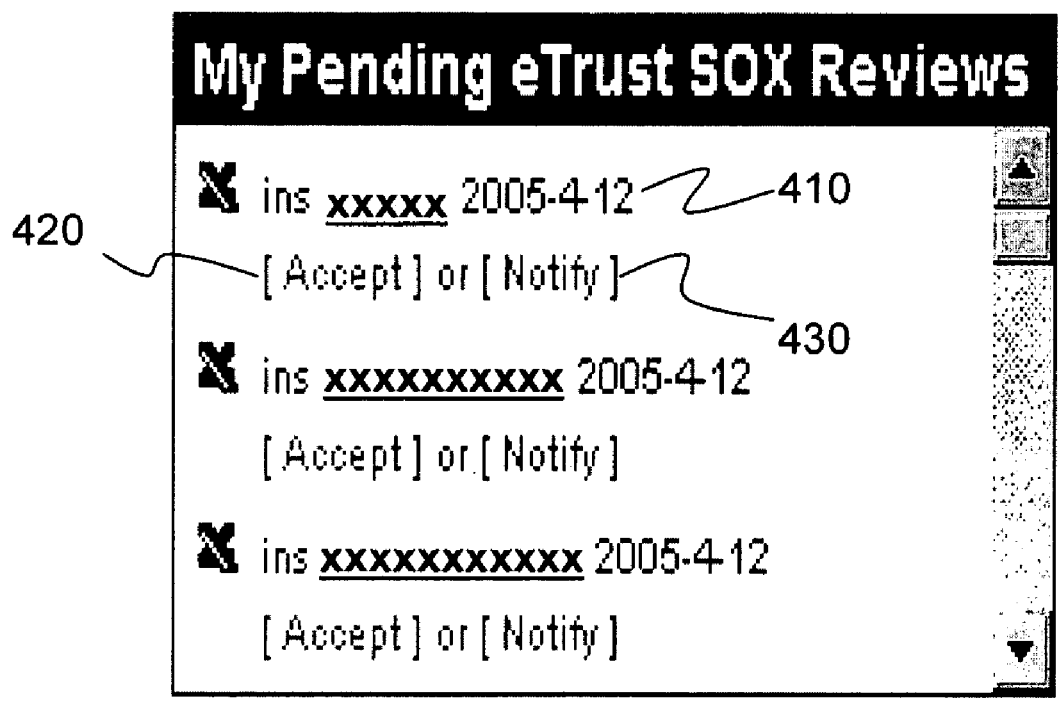
FIG. 4 illustrates a view of an exemplary user interface for retrieving and reviewing log reports according to the present invention.

FIG. 4 illustrates in exemplary user interface for retrieving and reviewing a log report. As shown in FIG. 4, a list of reports 410 to be reviewed is presented to the reviewer. The list may be presented as a clickable list of files and hyperlinks 410-430. However, other types of interfaces may be used without departing from the scope of the invention. In this example, a reviewer may click on the name of the report 410 to review the log report. When the report 410 is selected, the event log is presented to the user for review.

Figure 5A:
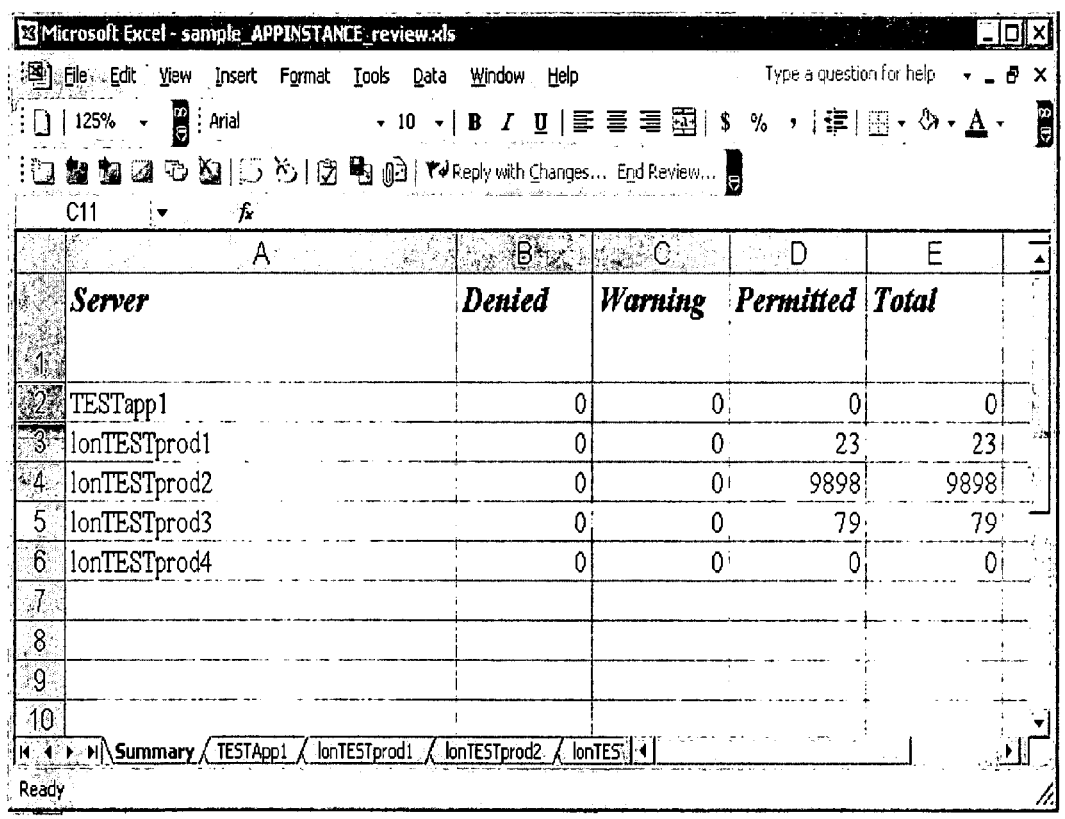
FIGS. 5A and 5B are views of an exemplary log report according to the present invention.
Figure 5B:
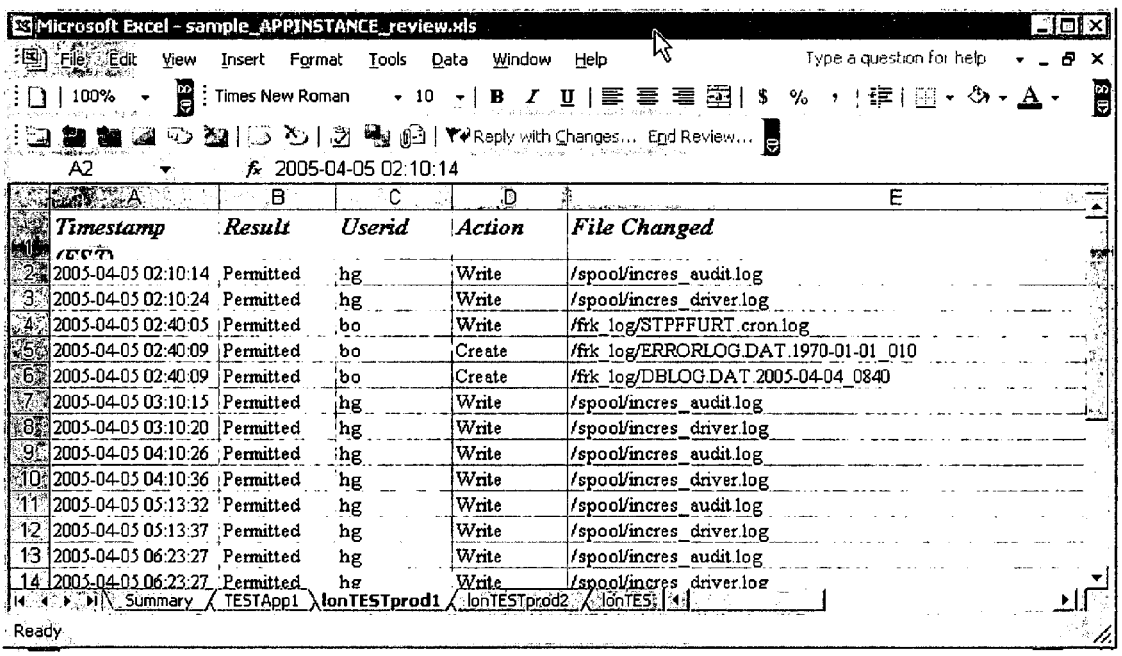

FIG. 5A and 5B are various views of an exemplary report. As shown in FIG. 5A, the summary page of the report displays the name of the assets (i.e., the name of the servers) and the number of events that were logged for each of the assets. In this example, the specific log data for each asset is organized into separate tabs for each of the assets. As shown in FIG. 5B, the log data for the asset (i.e., "IonTESTprod1") may include the time of the event, result of the requested access, the identification of the user who accessed the asset, the action performed by the user on the asset, and the modifications made on the asset. Other types of log information regarding an asset may be displayed without departing from the scope of the present invention.

Figure 6:
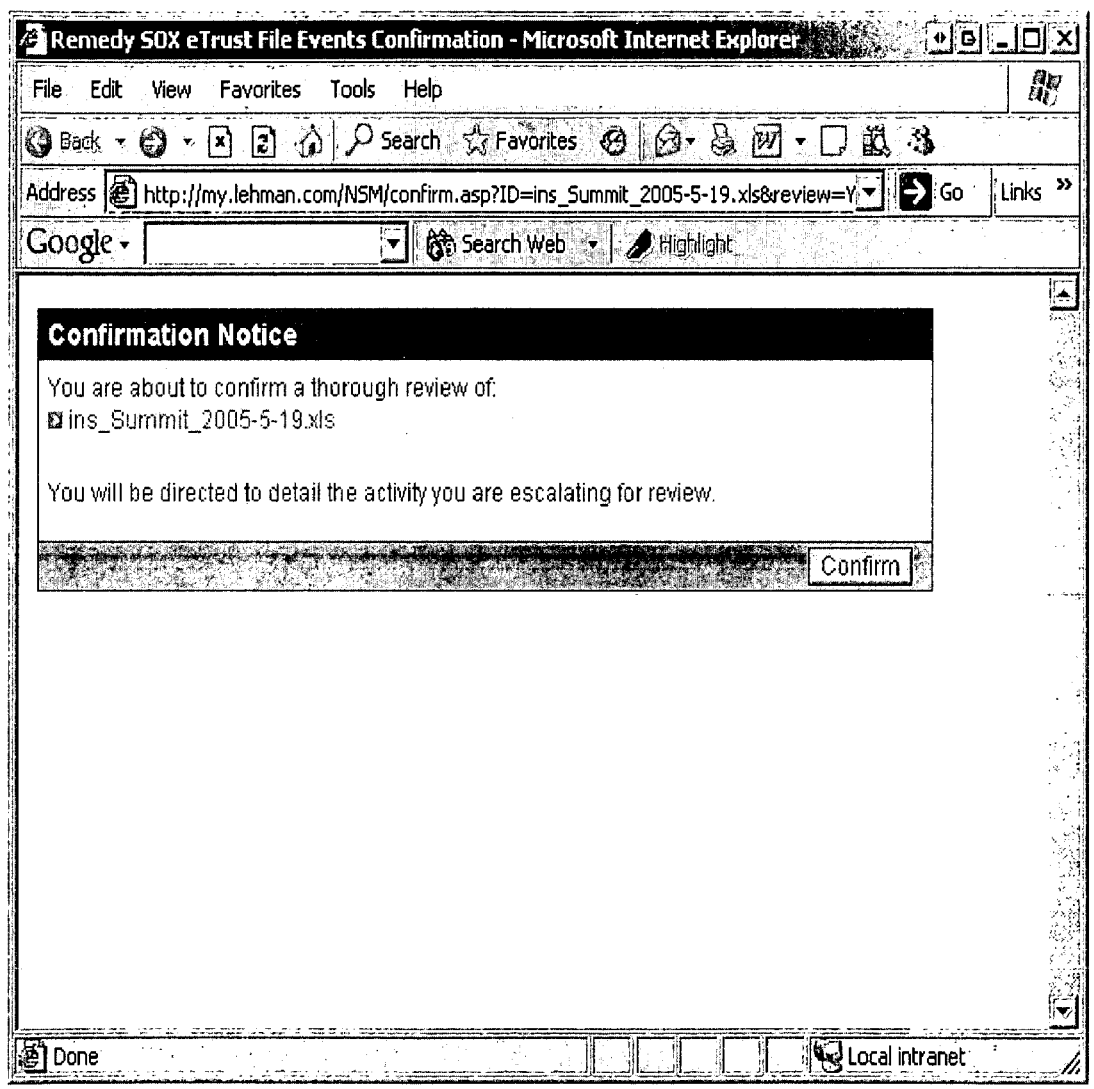
FIG. 6 illustrates a view of an exemplary escalation confirmation notice according to the present invention.
Figure 7:
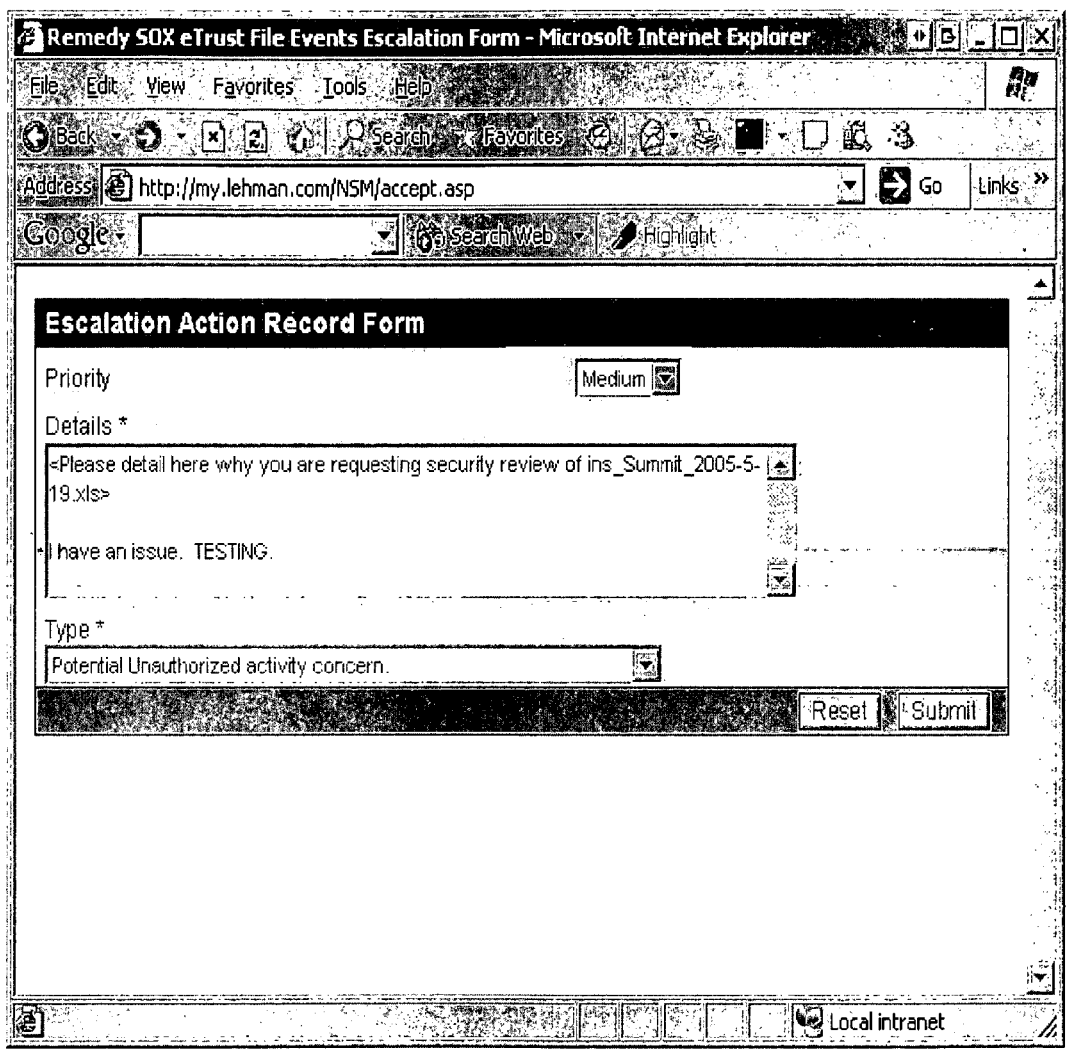
FIG. 7 illustrates a view of an exemplary escalation action record form to provide information regarding the escalation action according to the present invention.
Figure 8:
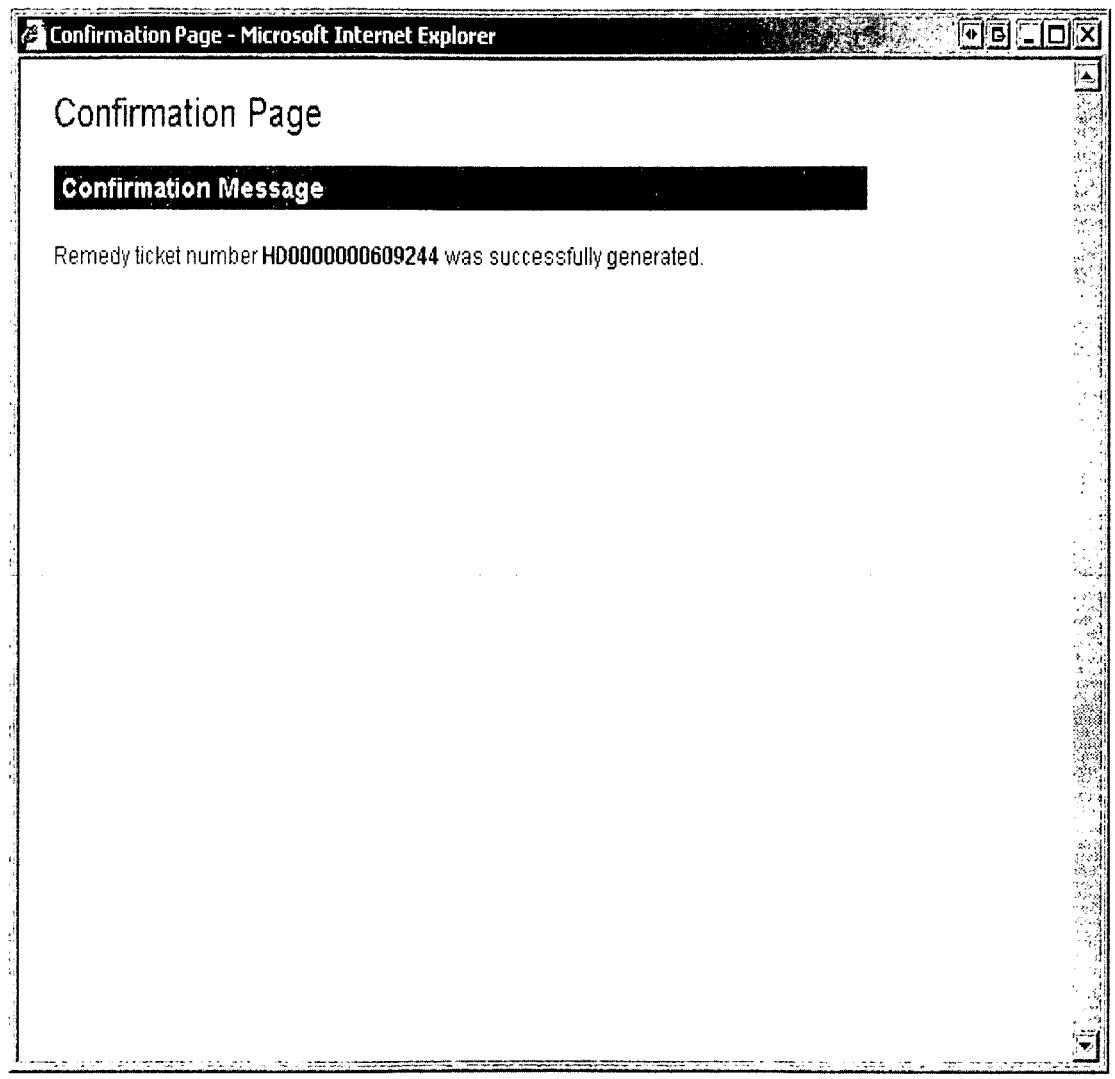
FIG. 8 illustrates a view of an exemplary confirmation message according to the present invention.

Once the reviewer has reviewed the log data regarding the reviewer's assets, the reviewer acknowledges the review of the report (e.g., "accept" link 420). If, upon review of the log data, the reviewer finds suspicious activity in the report, the reviewer may escalate the review to a security personnel (e.g., "notify" link 430). If a report is escalated, an escalation confirmation notice may be presented to the reviewer. FIG. 6 illustrates a view of an exemplary escalation confirmation notice. Once the reviewer confirms the escalation process, the reviewer may record the escalation action and document the reason for the escalation. FIG. 7 illustrates a view of an exemplary escalation action record form to provide information regarding the escalation action. When the review is finished, the report monitor 230 generates a confirmation ticket. FIG. 8 illustrates a view of an exemplary confirmation message.

A shown in FIG. 2, a ticket tracking system 230*c* confirms that a report has been reviewed and stores the information in the report tracking database 220*b*. If an escalation has been initiated, the occurrence of the escalation is noted in the report tracking database 220*b* and the escalation notice is forwarded to a security personnel for further review of the indicated log report. Additional information regarding the escalation, such as a time stamp of the escalation notice and the person and/or department to whom the escalation request is forwarded, may also be stored in the report tracking database 220*b*.

The ticket tracking system 230*c* also monitors outstanding reports in the report archive database 220*a* that has not yet been reviewed. Based on a predetermined expiration period, the report monitor 230 may reissue the notification message to the reviewer regarding any delinquent reviews of reports. Alternatively, the ticket tracking system 230*c* may simply note that a review period of a report has expired and therefore not review. Moreover, the reviewer may request that a report notice be reissued in case the reviewer recognizes that a notification has never been received.

There are several advantages of the present invention. First, the log review management system of the present invention packages voluminous amounts of log data based on asset information so that the event logs are partitioned based on relevant assets. Moreover, because these packaged reports are only reviewed by those who are designated as the managers of the assets to which the log data pertains, the most knowledgeable personnel reviews the log data, thereby facilitating thorough review of the log data and quick identification of suspicious activities.

Second, because the log review management system of the present invention automatically correlates log data with associated assets directly from the asset database, the reports are packaged quickly and efficiently. Moreover, the ability to couple asset information from the asset database with the event log data allows continuity of information across the organization as all the information needed for the assets are contained in a central database. That is to say, if a separate designation of reviewers and asset information are stored in disparate management systems throughout the organization, updates to the asset information may become disjointed if all of the databases are not updated together. In the log review management system of the present invention, only one database (i.e., the asset database) need to be maintained to provide accurate information regarding the assets and designated asset managers.

Third, packaging the log reports based on the asset information from the asset database and notifying only the designated asset managers in the asset database ensures secure review of the event log data. Furthermore, because only the designated asset managers in the asset database are authorized to view the log reports associated with the assets under the manager's care, improper review may be spotted quickly and easily.

Fourth, because the raw event log data, log reports, and report tracking data are stored in separate databases, integrity and security of the data from inadvertent modification can be avoided. This ensured integrity becomes especially important in the context of preventive and detective controls related to Sarbanes-Oxley regulatory compliance. Moreover, because the log reports and review activities are time stamped and stored over a period of time, auditing of security measures is easily facilitated.

While specific examples have been used to describe the present invention, it will be apparent to those skilled in the art that various modifications and variations can be made in the system and method for security log review of the present invention without departing form the spirit or scope of the invention. Thus, it is intended that the present invention cover the modifications and variations of this invention provided they come within the scope of the appended claims and their equivalents.

What is claimed is:

1. A system, comprising:
   an event log source configured to generate raw event log data associated with modification of an asset of an electronic network;
   a security information manager configured to receive and normalize the raw event log data into a common data format, the normalized event log data including information associated with an event;

wherein the normalized event log data includes an asset identifier, the log report generator extracting the asset identifier from the normalized event log data and retrieving asset information from the asset database using the asset identifier included in the normalized event log data;

at least one computer including an event log database configured to store the normalized event log data and an asset database configured to store asset information where only the asset database is maintained to provide accurate information regarding the assets, the event log database being inaccessible by authorized users in order to maintain integrity of the data;

wherein the event log data are received, processed, and stored in real-time as the events occur throughout the network;

a log report generator configured to correlate the normalized event log data in the event log database with the asset information in the asset database and to package the correlated event log data and asset information into a log report;

a review monitor configured to track a review status of the log report, the review monitor including an electronic notification configured to notify a reviewer of the log report to be reviewed, the review monitor notifying the reviewer of delinquency of a review if the log report is not reviewed within a predetermined time period, the review monitor including a user interface configured to escalate the log report for further review in the event that the reviewer selects a notify link on the user interface; and a report tracking database configured to store the review status of the log report, wherein the review status includes an escalation of the log report for further review upon determination regarding the modification of the asset was suspicious activity, and at least one of a first time stamp of when availability of the log report is communicated to a reviewer, a period of time covered by the log report, and a second time stamp of when the log report is reviewed, wherein the log report generator packages the correlated event log data according to asset type or asset name.

2. The system of claim 1, further comprising a report archive database configured to store the log report.

3. The system of claim 2, wherein the report archive database further stores metadata related to the log report including at least one of an issue time of the report, a name of a reviewer, a name of the report, and a count of events to be reviewed in the report.

4. The system of claim 1, wherein the review monitor further includes a portal configured to access the log report to be reviewed.

5. The system of claim 4, wherein the portal is either an internet or an intranet portal.

6. The system of claim 1, wherein the reviewer is an asset manager designated in the asset database.

7. The system of claim 1, wherein the review monitor includes an electronic ticket configured to track the review status of the log report.

8. The system of claim 1, wherein modification of the asset includes modification to data files and applications stored on the asset.

9. A method comprising the steps of:
generating raw event log data associated with modification of an asset of an electronic network;
receiving and normalizing raw event log data into a common data format, the normalized event log data including information associated with an event;
wherein the normalized event log data includes an asset identifier, the method further comprising extracting the asset identifier from the normalized event log data and retrieving asset information from the asset database using the asset identifier included in the normalized event log data;
storing the normalized event log data in an event log database, the event log database being inaccessible by authorized users in order to maintain integrity of the data;
wherein the event log data are received, processed, and stored in real-time as the events occur throughout the network;
storing asset information in an asset database where only the asset database is maintained to provide accurate information regarding the assets;
correlating the normalized event log data in the event log database with the asset information in the asset database;
packaging the correlated event log data and the asset information into a log report;
tracking a review status of the log report;
notifying a reviewer of the log report to be reviewed by an electronic notification;
notifying the reviewer of delinquency of a review if the log report is not reviewed within a predetermined time period;
providing a user interface configured to escalate the log report for further review in the event that the reviewer selects a notify link on the user interface;
storing the review status of the log report in a report tracking database, wherein the review status includes an escalation of the log report for further review upon determination regarding the modification of the asset was suspicious activity, and at least one of a first time stamp of when availability of the log report is communicated to a reviewer, a period of time covered by the log report, and a second time stamp of when the log report is reviewed; and
packaging the correlated event log data according to asset type or asset name.

10. The method of claim 9, further comprising the step of storing the log report in a report archive database.

11. The method of claim 10, wherein the step of storing the log report includes storing metadata related to the log report including at least one of an issue time of the report, a name of a reviewer, a name of the report, and a count of events to be reviewed in the report.

12. The method of claim 9, further comprising the step of accessing a portal to review the log report.

13. The method of claim 12, wherein the portal is either an internet portal or an intranet portal.

14. The method of claim 9, wherein the reviewer is an asset manager designated in the asset database.

15. The method of claim 9, wherein modification of the asset includes modification to data files and applications stored on the asset.

* * * * *